No. 753,733. PATENTED MAR. 1, 1904.
H. H. PIPER.
WAGON BRAKE.
APPLICATION FILED OCT. 24, 1903.
NO MODEL. 2 SHEETS—SHEET 1.
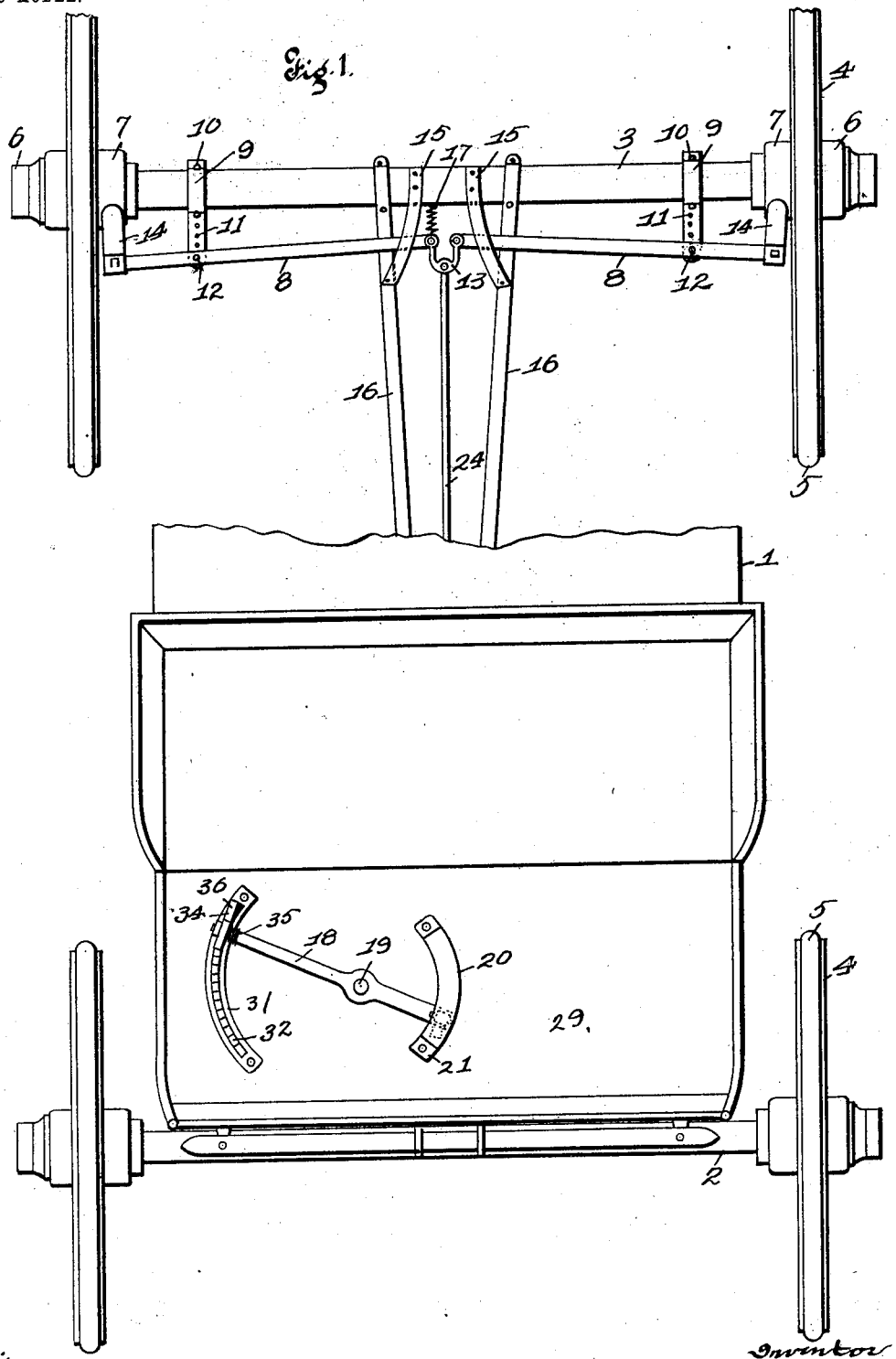

No. 753,733. PATENTED MAR. 1, 1904.
H. H. PIPER.
WAGON BRAKE.
APPLICATION FILED OCT. 24, 1903.
NO MODEL. 2 SHEETS—SHEET 2.
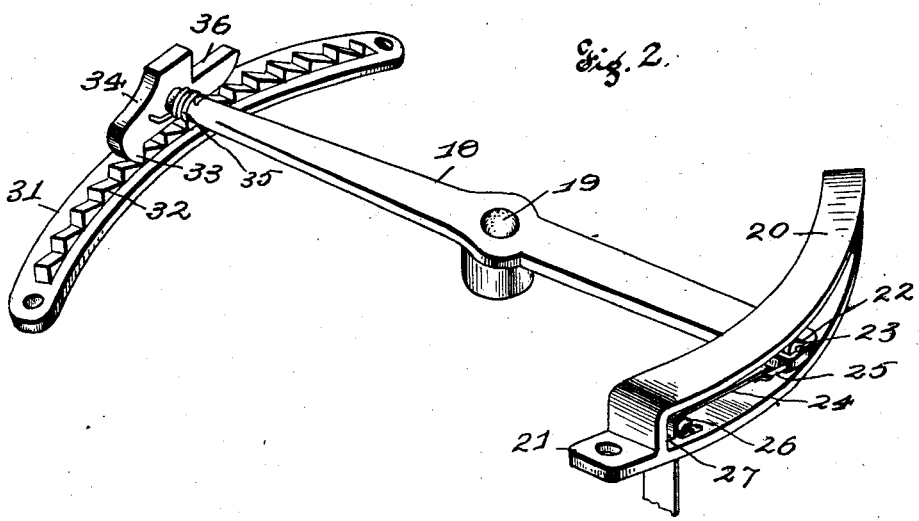
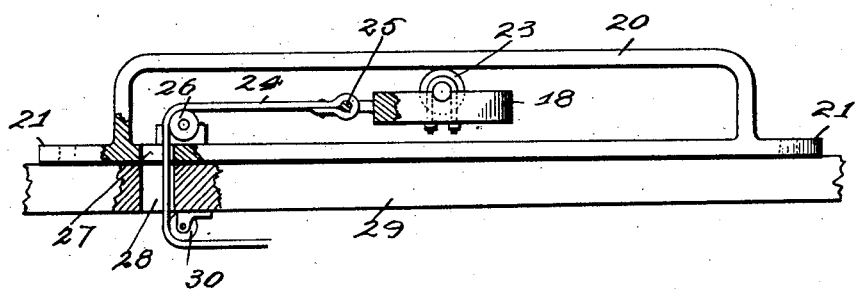
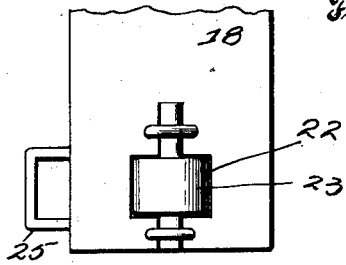
Witnesses
Alfred A. Eicks
W. Silver
Inventor
Herbert H. Piper
by Higdon & Longan & Hopkins Attys.

No. 753,733. Patented March 1, 1904.

UNITED STATES PATENT OFFICE.

HERBERT H. PIPER, OF JACKSON, MISSOURI, ASSIGNOR OF FOUR-FIFTHS TO JOHN MABREY, PLEASANT SNIDER, HENRY J. BEHRENS, AND CHARLES BEHRENS, OF JACKSON, MISSOURI.

WAGON-BRAKE.

SPECIFICATION forming part of Letters Patent No. 753,733, dated March 1, 1904.

Application filed October 24, 1903. Serial No. 178,424. (No model.)

*To all whom it may concern:*

Be it known that I, HERBERT H. PIPER, a citizen of the United States, residing at Jackson, Cape Girardeau county, State of Missouri, have invented certain new and useful Improvements in Wagon-Brakes, of which the following is a specification containing a full, clear, and exact description, reference being had to the accompanying drawings, forming a part hereof.

My invention relates to wagon-brakes; and it consists of the novel construction hereinafter described and claimed.

The object of my invention is to provide an improved brake which can be operated by the driver's foot, and thereby leave his hands free, and which shall be especially adapted for use on rubber-tired vehicles.

In the drawings, Figure 1 is a plan view of a vehicle having my improved brake applied thereto, parts being broken away. Fig. 2 is a perspective view of the ratchet foot-lever and parts connected therewith. Fig. 3 is a sectional end elevation of the same. Fig. 4 is a top plan view of one end of said lever enlarged.

1 indicates the body of the vehicle supported in the usual manner upon the front axle 2 and rear axle 3, and this in turn supported upon wheels 4, provided with rubber tires 5. Upon the inner end of each of the rear hubs 6 I locate a metallic band 7.

8 8 indicate two brake-levers which extend substantially parallel to the rear axle 3 and are fulcrumed thereto or to some fixed part of the running-gear, preferably by means of the bracket 9, which is secured to the axle by means of suitable bolts 10. Said bracket has a horizontal arm in which is formed a series of apertures 11, and the fulcrum-bolt 12 is adapted to be located in either of said apertures. The inner ends of said brake-levers 8 8 are connected by means of a U-shaped link 13, and the outer ends of said brake-lever carry a brake-shoe 14, which may be of any suitable material.

15 indicates a guide-bracket for the inner portion of the brake-levers, and this bracket has its rear end fixed to the rear axle 3, and its forward end is secured to the reach 16. The brake-shoes are normally held out of contact with said metallic band 7 by means of a spring 17, one end of which is secured to the rear axle 3 and the opposite end of which is secured to the link 13.

18 indicates a horizontal foot-lever pivoted about midway of its length to the bottom of the wagon-bed, the pivot-bolt being indicated by the numeral 19. 20 indicates a curved bracket having upper and lower alined rails, between which one end of the said foot-lever moves. Said bracket 20 is provided with perforated ears 21, by means of which it is secured in position. Mounted in a recess 22, formed in the foot-lever near the end of the same and adapted to engage the upper rail of said bracket, is a roller 23. 24 indicates a strap or band, which may be made of leather or any suitable material and one end of which is connected to said foot-lever in the space between said upper and lower rails of said braket 20, and such connection is preferably made by means of a loop 25, projecting from the forward edge of said foot-lever. Said strap 24 passes over a roller 26, mounted upon the lower rail of said bracket, and thence passes downwardly through a slot 27, formed in the lower rail of said bracket, and a slot 28, formed in the wagon-bed floor 29, and thence beneath another roller, 30, and thence rearwardly and has its end connected to the link 13.

31 indicates a curved ratchet-bar fixed upon the wagon-bed floor beneath the end of said foot-lever 18 which is opposite that which carries the roller 23. Said ratchet-bar is provided upon its upper surface with ratchet-teeth 32, which are adapted to be engaged by a downwardly-projecting nose 33, formed upon the foot-pawl 34, which latter is pivotally mounted upon said foot-lever 18 directly above said teeth. A suitable spring 35 has its ends fixed to the said foot-lever and is coiled around the latter and has its opposite end fixed to said foot-pawl 34 for the purpose of urging said nose into contact with said teeth. The rear portion of said foot-pawl is provided with an annular recess 36.

The operation is as follows: When it is desired to apply the brakes, the operator causes his foot to engage the foot-lever 18 at a point near the foot-pawl 34 and throws the same forward, thereby causing the nose 33 to slip over the teeth 32 and causing the opposite end of said foot-lever to be moved rearwardly, and such movement will draw the strap 24 taut, and thereby apply the brake-shoes 14. When it is desired to release the brakes, the operator causes his foot to engage the recess 36 in the foot-pawl 34 and by pressing downwardly thereon the nose 33 of the said foot-pawl will be disengaged from said teeth and the brakes will be released, the spring 17 causing the parts to return to their normal position, which is that in which they are shown in Fig. 1.

What I claim is—

1. The improved wagon-brake, comprising brake-shoes, the part with which said brake-shoes come in contact, a horizontal foot-lever pivoted intermediate of its length to the lower part of the wagon-frame, a strap or band connected to one end of said foot-lever, connections between said strap or band and said brake-shoes, a foot-pawl pivotally mounted upon the end of said foot-lever opposite that to which said strap or band is connected, and a horizontal curved bar having ratchet-teeth upon its upper side and located beneath said foot-pawl to be engaged thereby, substantially as described.

2. The improved wagon-brake, comprising brake-shoes, the part with which said brake-shoes come in contact, a foot-lever pivoted intermediate of its length to the lower part of the wagon-frame, a strap or band connected to one end of said foot-lever, connections between said strap or band and said brake-shoes, a foot-pawl pivotally mounted upon the end of said foot-lever opposite that to which said strap or band is connected, a curved bar having ratchet-teeth and located beneath said foot-pawl to be engaged thereby, a roller carried by the strap end of said foot-lever, and a guide-bracket having upper and lower curved alined rails for guiding said foot-lever, substantially as described.

In testimony whereof I have signed my name to this specification in presence of two subscribing witnesses.

HERBERT H. PIPER.

Witnesses:
M. G. IRION,
JOHN C. HIGDON.